United States Patent [19]

Yamaguchi et al.

[11] Patent Number: 5,192,413
[45] Date of Patent: Mar. 9, 1993

[54] ELECTROOSMOTIC DEWATERER

[75] Inventors: Mikimasa Yamaguchi; Michio Nakagawa; Hideyuki Ohanamori; Masayuki Yoshida; Toshitaka Arai; Hiroshi Matsushita, all of Kanagawa, Japan

[73] Assignee: Fuji Electric Co., Ltd., Kanagawa, Japan

[21] Appl. No.: 82,332

[22] Filed: Aug. 6, 1987

[30] Foreign Application Priority Data

Apr. 13, 1987 [JP] Japan .................. 62-90026
Apr. 13, 1987 [JP] Japan .................. 62-90030

[51] Int. Cl.$^5$ .................. B01D 61/42; C03C 5/02; C02F 11/12; C02F 1/469
[52] U.S. Cl. .................. 204/300 R; 204/299 R; 204/180.1
[58] Field of Search ........... 204/300 R, 182.3, 182.2, 204/299 R, 301, 302, 304, 305, 306, 307, 308, 183.1

[56] References Cited

U.S. PATENT DOCUMENTS

| | | | |
|---|---|---|---|
| 3,396,097 | 8/1968 | Wolcott | 204/180.1 |
| 3,865,711 | 2/1975 | Anderson | 204/302 |
| 3,962,069 | 6/1976 | Inoue et al. | 204/182.3 X |
| 4,003,811 | 1/1977 | Kunkle | 204/299 R X |
| 4,003,819 | 1/1977 | Kunkle et al. | 204/301 |
| 4,101,400 | 7/1978 | Pepping | 204/180 |
| 4,230,544 | 10/1980 | McRae | 204/128 |
| 4,244,804 | 1/1981 | Moeglich | 204/300 R |
| 4,305,797 | 12/1981 | Knoll et al. | 204/300 R X |
| 4,312,737 | 1/1982 | Kircher | 204/288 X |
| 4,444,637 | 4/1984 | King | 204/304 X |
| 4,551,217 | 11/1985 | King | 204/304 X |
| 4,671,874 | 6/1987 | Fremont et al. | 204/300 R X |
| 4,680,104 | 7/1987 | Kunkle et al. | 204/300 R |

FOREIGN PATENT DOCUMENTS

| | | | |
|---|---|---|---|
| 78462 | 3/1919 | Fed. Rep. of Germany | 204/182.3 |
| 9036507 | 2/1984 | Japan | 204/302 |
| 0068018 | 4/1985 | Japan | 204/182.3 |
| 0097011 | 5/1985 | Japan | 204/180.1 |
| 0097012 | 5/1985 | Japan | 204/180.1 |
| 1268310 | 11/1986 | Japan | 204/300 R |
| 2061608 | 3/1987 | Japan | 204/301 |

OTHER PUBLICATIONS

Patent Abstracts of Japan, vol. 5, No. 124 (C-66) [796], Aug. 11, 1981; & JP-A-56 62503 and JP-A-56 60604 (Kurita Kogyo K.K.) Dec. 25, 1981.
Patent Abstracts of Japan, vol. 11, No. 259 (C-441) [2706], Aug. 21, 1987; & JP-A-62 61608 (Fuji Electric Co. Ltd.) Mar. 18, 1987.
Patent Abstracts of Japan, vol. 9, No. 138 (C-286) [1861], Jun. 13, 1985; & JP-A-60 25597 (Fuji Denki Sougou Kenkyusho K.K.) Feb. 8, 1985.
Informal translation of German Austrian Patent No. 78462 to Schwerin Gesellschaft.

Primary Examiner—John Niebling
Assistant Examiner—John S. Starsiak, Jr.
Attorney, Agent, or Firm—Finnegan, Henderson, Farabow, Garrett and Dunner

[57] ABSTRACT

An electroosmotic dewaterer for dehydrating a liquid mud by supplying the liquid mud into a space between facing anode and cathode electrodes, applying d.c. voltage across said electrodes so as to gather the water content of the liquid mud to the cathode electrode by means of electroosmotic action and filtering the liquid through a filtering medium, wherein the cathode electrode is equipped with means for removing a deposit formed on the surface thereof while the dehydrating operation is carried out.

15 Claims, 10 Drawing Sheets

ELECTROOSMOTIC DEWATERER

BACKGROUND OF THE INVENTION

The present invention relates to an electroosmotic dewaterer for continuously extracting water from a substance to be dehydrated, including surplus liquid mud produced in sewage disposal plants and mud slurries produced in the fields of food and other industries, by the use of electroosmotic effect and pressure.

Various types of conventional electroosmotic dewaterer is disclosed in Japanese Patent Application Laid Open No. 25597/85. Referring to FIG. 1 through 3, a description will be given to the schematic construction of an electroosmotic dewaterer of conventional rotary drum type and continuous process type. As shown in FIG. 1, a rotary drum 1 is provided with an anode electrode 2 made of high electrolytic corrosion resistant material and bonded to the outer peripheral face thereof. The drum shaft 1a of the rotary drum 1 is pivotally supported by a frame 4 shown in FIG. 2 via a bearing 3 as shown in FIG. 2. An endless filter belt 5 and a metal caterpillar-like press conveyor 6 used as a cathode electrode and superposed on the filter belt 5 is stretched on sprockets 7a~7d opposite to a part of peripheral area of the rotary drum 1. A liquid mud compression passage 8, whose gap between the electrodes gradually decreases from entrance toward exit, is provided between the filter belt 5 and rotary drum 1. Further, a filtered water receiving saucer 9 communicating with a discharge channel outside the system is installed via the filter belt 5 and the press conveyor 6 under the liquid mud compression passage 8.

A driving motor 10 is interlockingly coupled to the sprocket 7b and a liquid mud supply hopper 11 is arranged at the entrance of the liquid mud compression passage 8, whereas a scraper 12 for peeling and recovering the dehydrated mud cake is set opposite to the filter belt 5 at the exit thereof. Further, presses 13, together with press position adjusting bolts 14 and hydraulic cylinders 15, are installed along the peripheral face of the press conveyor 6 at the back of the liquid mud compression passage 8.

On the other hand, a d.c. power supply 18 is connected via a power supply brush 17 to a power supply slip ring 16 attached to the shaft end 1a of the rotary drum 1 and to a slip ring installed at the supporting shaft of the sprocket 7a being in contact with the press conveyor 6 of a cathode electrode. In this case, the anode electrode 2 arranged on the periphery of the rotary drum 1 is provided with the following insulating construction so as to be supplied with power from the power supply 18. As shown in FIGS. 2 and 3, the anode electrode 2 is installed via an insulating material 19 on the periphery of the rotary drum 1 and both edges thereof are fixed to the rotary drum 1 by end plates 20 of fiber reinforced plastics. Further, a bus bar 21 led from the slip ring 16 provided at the shaft end via the hollow drum shaft 1a into the rotary drum 1 is connected via a connecting bolt 22 passed through the rotary drum 1 to the electrode 2. In order to insulate the connecting bolt 22 relative to the rotary drum 1, the connecting bolt 22 is provided with an insulating washer 23 and sleeve 24. The drum shaft 1a of the rotary drum 1 is divided in the axial direction to back up the insulation thereof and insulating materials 25 are held between flanges attached to the shaft thus divided, between the drum shaft and the slip ring 16 and between the bearing 3 and the frame 4 installed on the ground side, respectively. The insulating materials 25 are insulated and bolted in the same manner as what is shown in FIG. 3. Such power supply system to the anode electrode and particularly a power supply construction toward the anode electrode attached to the rotary drum is also disclosed in Japanese Patent Application Laid Open No. 60604/81 and is well known.

With the aforesaid arrangement, when liquid mud 26 as a substance to be dehydrated is supplied via the hopper 11 into the liquid mud compression passage 8 while the driving motor 10 is operated and the d.c. voltage is applied by the power supply 18 to the anode and cathode electrodes, the liquid mud is carried toward the exit of the liquid mud compression passage, i.e., in the direction of arrow P while being sandwiched by the rotary drum 1 and the filter belt 5. During the carrying step, electroosmotic action, in addition to mechanical compressive force, is applied by the electric field formed between the facing electrodes to the liquid mud 26 being carried. The slurry particles of the liquid mud 26 is forced by the electroosmotic action to move to the anode side, whereas the water included in the liquid mud 26 is positively charged, caused to flow toward the cathode side and discharged thereat, then by the aforesaid mechanical compressive force in addition to the electroosmotic action, the water passes through the filter belt 5 and is brought down via the discharged channel formed in the press conveyor 6 to the filtered water receiving saucer 9 and discharged therefrom. On the other hand, the liquid mud 26 thus dehydrated in the passage 8 is converted into a cake containing a low percentage of water and the cake 27 thus dehydrated is discharged via the scraper 12 from the exit of the passage 8 and burned or reutilized as a composite fertilizer.

The following problems arises when the electroosmotic dewaterer thus constructed is operated to dehydrate sewage mud and the like.

When the aforesaid electroosmotic dewaterer was used to dehydrate mud produced in a sewage plant, white solid substances were deposited on the surface of the press conveyor of cathode electrode as the operating time lapses and those substances were seen to have accumulated in the form of layer. As the quantity of the solid substances thus accumulated increased, the power consumption of the electroosmotic dewaterer increased and the discharge channel of the press conveyor was also clogged with the deposits, thus preventing the smooth flow of the filtered water. In consequence, it was confirmed that the dehydration efficiency was reduced to a considerable extent.

The present inventors therefore collected the white deposits and made a quantitative analysis of them using an X-ray analyzer. The table 1 below shows the results of the quantitative analysis.

TABLE 1

| Components | Quantity (weight %) | Components | Quantity (weight %) |
|---|---|---|---|
| Ca | ++++ | Zr | tr~± |
| K | ++ | Sr | ±~+ |
| Cl | +~++ | Zn | tr~± |
| Si | ++~+++ | Cr | tr~± |
| Al | + | Ni | tr |
| S | ++ | Fe | ±~+ |
| P | ++ | Mn | ±~+ |
| Mg | ++~+++ | Cr | tr |

TABLE 1-continued

| Components | Quantity (weight %) | Components | Quantity (weight %) |
|---|---|---|---|
| Na | tr | | | where the weight % of the standard quantity in the above table is:
++++ ... more than 10;
+++ ... 1~10;
++ ... 0.1~1;
+ ... 0.01~0.1;
± ... 0.001~0.01; and
tr ... less than 0.001.

In the X-ray diffraction analysis of the deposits, the calcium content as the largest one in the above table was proved to be calcium hydroxide. The reason for the production of calcium hydroxide during the electroosmotic is assumed to be the following; namely, the liquid mud in the sewage contains a number of calcium ions, which are positively charged cations and, when the liquid mud is electroosmotically dehydrated, the calcium ions together with the water contained in the mud are led to the cathode side, whereby the calcium hydroxide is produced in accordance with the reaction expressed by the following equation and attached to the surface of the cathode electrode:

$$Ca^+ + 2e \rightarrow Ca, \quad Ca + 2H_2O \rightarrow Ca(OH)$$

Moreover, the calcium hydroxide is, as is well known, electrically nonconductive and such a substance accumulated and attached to the surface of the cathode electrode increases the resistance of the electrode and power loss when the voltage is applied thereto and thus causes the electrode to produce a large amount of Joule heat.

In the meantime, the speeds at which the solid substances attach to the electrode and the electric resistance of the electrode increases, were examined on the basis of the results obtained from the test machine and the present inventors observed:

speed at which the solid substance attached to the electrode = 0.01 g/AH·dm$^2$; and speed at which the electric resistance increased = 0.04 Ω/AH·dm$^2$. In the process of electroosmotical dehydration of mud, voltage is applied across the anode and cathode electrodes so that a current having a density ranging from 3 to 6 A/dm$^2$ is normally caused to flow therebetween. Accordingly, the quantity of substances produced and attached to the surface of the press conveyor as a cathode electrode and that of increased electric resistance per unit time when the electroosmotic dewaterer is operated to dehydrate the sewage mud, can be obtained by multiplying the current density by the speeds at which the solid substance attaches thereto and at which the electric resistance increases. The values thus obtained by way of trial are:

Quantity of substances attached = 0.3~0.6 g/dm$^2$
Quantity of increased electric resistance = 0.12~0.24 Ω/dm$^2$ Further, the following problems as to the maintenance of insulation of an electrical path to the anode arises during the operation of the electroosmotic dewaterer thus constructed.

When the aforesaid electroosmotic dewaterer is started, a large quantity of Joule heat is generated as the liquid mud is supplied with power so that a large quantity of steam is produced from the heated liquid mud and is spread in the surroundings. Because of this, in the conventional power supply construction relative to the anode electrode 2 permits the steam enters into the small gap between the insulating materials installed in each principal places and condenses therein, so that defective insulation occurs between the electrode 2 and the rotary drum 1 or the rotary drum 1 and the frame 4. Moreover, because 3~5 kg/cm$^2$ pressure is applied to the liquid mud in the passage 8 during the operation of the dewaterer, the reaction force of the compression force is applied to the rotary drum 1 as a bending stress. For the above reason, the drum shaft may be bent and the insulating material inserted in between the flanges of the divided shafts may often be damaged and, when the insulating material is thus damaged, the steam is facilitated to enter into the small gap therebetween. In consequence, the defective insulation is often caused during the operation of the conventional electroosmotic dewaterer, whereby power often leaks from the anode via the rotary drum, the frame and the like to the ground, so that the trouble of the loss of electroosmotic dewaterer function often occurs. In order to avoid the operating trouble of the dewaterer due to the defective insulation, the dewaterer should be subject to frequent checks for insulation and, when a defective insulation point is found, the defective insulation point should be remedied correctly each time it is found. Thus, the management of dewaterer operation is troublesome.

On the other hand, a measure to prevent the generation of the defective insulation has once been taken by completely covering the gap between the insulating points with resin. However, the increased size of the machinery limits the application of the aforesaid method and the only method has been to coat the insulating points with resin. According to the resin coating method, the layer of resin is thin and to completely cover the gap with the layer of resin is difficult so that sufficient reliability can not be attained.

Still further, the following problems as to the anode electrode arise. The anode electrode 2 of the rotary drum for use in the aforesaid electroosmotic dewaterer has conventionally been made of stainless steel, nickel steel or soft-iron in the form of a plate, or carbon-sintered plate. According to the facts known to the present inventors through the operation of such an electroosmotic dewaterer, the anode electrode made of the aforesaid materials has the following disadvantages: namely, the electrode made of stainless, nickel steel or soft-iron allows its component to ionize because of the current flowed and to melt into the liquid mud so that the electrode is consumed as the time elapses. The value of the consumption per unit time under a current supply condition of 1 A/dm$^2$ in the case of stainless steel (SUS 304) is 156 mg/A-Hr and as great as 1,050 mg/A-Hr in the case of the nickel steel. Furthermore, the life of the electrode is shortened because a current of about 3 A/dm$^2$ practically passes through such an electroosmotic dewaterer. Moreover, the electrode made of stainless steel, nickel steel or the like may cause a secondary pollution because the heavy metal ions melted out of the electrode supplied with current is mixed into the substance to be dehydrate or filtered water. In addition, the soft-iron plate may be oxidized during the use and oxidized iron is formed in layers on the electrode, which extremely decreases conductivity thereof. When precious metals such as platinum are used for the anode electrode, the consumption of the electrode is small and excellent conductivity is attained, however, such metals are expensive and cannot be put to practical use economically. On the other hand, the carbon sintered plate has a feature that its consumption due to the flow of current is 47.6 mg/A-Hr under the same condition, which is considerably smaller than that of the aforesaid metal electrode. However, its electrical resistivity is large so that current flow property is low. Also, its mechanical strength and wear resistance is low so that cracks may be produced because of the compressive load applied to the electrode in use, and the wear thereof resulting from its contact with the substance to be dehydrated may be accelerated.

If the facing electrodes are worn out during the operation of the electroosmotic dewaterer, the distance therebetween slightly changes and this fact makes it necessary to alter the voltage supply condition of the power supply and to adjust the distance therebetween to maintain the efficient operation of the dewaterer. In order to cope with the aforesaid situation, the worn out electrodes must be replaced with new ones in a relatively brief period with interruption of the operation thereof. The resulting trouble of replacing the electrode and the time required therefor have reduced the operating efficiency of the dewaterer. The properties of the electrode, particularly the durability thereof form an important part in maintaining the performance of the dewaterer and, in view of this, the selection and improvement of materials constituting the electrode is an important problem.

SUMMARY OF THE INVENTION

The present invention is intended to solve the aforesaid problems inherent in the prior art.

An object of the invention is to provide an electroosmotic dewaterer capable of maintaining not only current flow property but also filtered water discharging function by removing substances produced and attached to the surface of a cathode electrode during the operation of the dewaterer.

Another object of the invention is to provide a stable, reliable electroosmotic dewaterer with particularly a power supply mechanism toward the anode electrode in which power leakage to the ground during the operation of the dewaterer is effectively prevented.

Still another object of the invention is to provide an electroosmotic dewaterer which comprises a durable electrode as an anode electrode capable of meeting electrical and mechanical requirements including the least consumption of the electrode due to current flow, a large mechanical strength, no fear of the secondary pollution resulting from the dissolved heavy metal ions and easy processability as an electrode.

In order to achieve the first object, the electroosmotic dewaterer according to the present invention is equipped with means for removing the substances produced and attached onto the surface of the cathode electrode during the operation of the dewaterer.

With the aforesaid arrangement, the means for removing the solid substances thus attached includes a brush type scraper for mechanically removing the deposits formed on the surface of the cathode electrode, a high-pressure water rinsing apparatus, an ultrasonic rinsing apparatus and a chemical rinsing apparatus, which are operated during the operation of the dewaterer when necessary, so that the solid deposits on the surface of the cathode electrode are removed. Consequently, the cathode electrode is usable in a clean surface state while almost no substances are attached thereto and thereby the electroosmotic dewaterer can be operated always with a high dehydration ratio.

In order to achieve the second object, the anode electrode is attached via the insulating material to the peripheral face of the rotary body and voltage is supplied by a power supply via a power supply mechanism to the outer surface of the anode electrode.

With the aforesaid arrangement, the power supply mechanism is a brush, roller, or shoe type power supply mechanism, for instance, arranged opposite to the outer periphery of the anode electrode, and the voltage supplied via the power supply mechanism by the power supply is directly applied to the outer surface of the anode electrode opposite to the rotary body. Accordingly, there are no connecting bolts necessary in the conventional supply mechanism, which inwardly passes through the rotary body and is connected to the anode electrode, and also there are no gaps across the insulating material of the connecting bolt which allows the steam to penetrate. Consequently, there arises no electrical leakage between the electrode and the rotary body due to the steam generated from the liquid mud during the operation of the dewaterer, so that safety from leakage can be improved considerably. Further, the slip ring and insulating material between the rotary body and the frame in the conventional construction can be dispensed with.

In order to attain the third object, the anode electrode according to the present invention is a composite one comprising a metal valve plate of titanium, tantalum and the like as an electrode base and a coating layer of platinum metal such as palladium, tellurium, rhodium and platinum or what contains at least one kind of platinum oxide offering excellent corrosion resistance and conductivity on the electrode base, so that the electrode base of the metal plate may provide the structure, strength and conducting function as an electrode material. Further, since the layer of platinum metal or what contains a platinum oxide is used as the electrode interface performing the basic function, the anode electrode offering great electrochemical and mechanical durability required for the properties of the electrode for an electroosmotic dewaterer is obtainable economically.

The composite electrode is prepared by bending the metal valve plate, forming the plate into desired electrode segments to provide the electrode base, applying a liquid with platinum chloride dissolved in alcohol or platinum oxide powder dispersed in alcohol to the surface of the electrode base, pyrolyzing the liquid by drying and heating after drying; or otherwise the electrode is prepared by electroplating the surface thereof with platinum metal.

Also, third object is attained by the anode electrode according to the present invention made of cast iron containing more than 10% by weight of silicon which is cast into a desired electrode shape and then mechanically worked to form an electrode for the dewaterer.

DETAILED DESCRIPTION OF THE PREFERRED EMBODIMENTS

Figure 1:
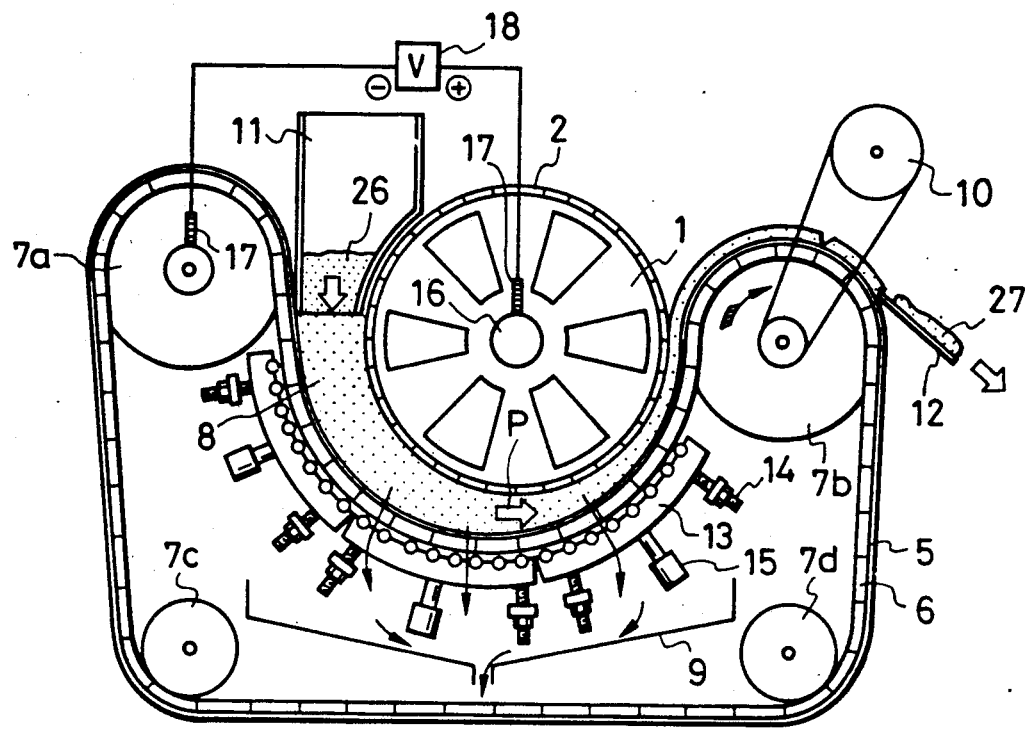
FIG. 1 is a block diagram of a conventional electroosmotic dewaterer.
Figure 4:
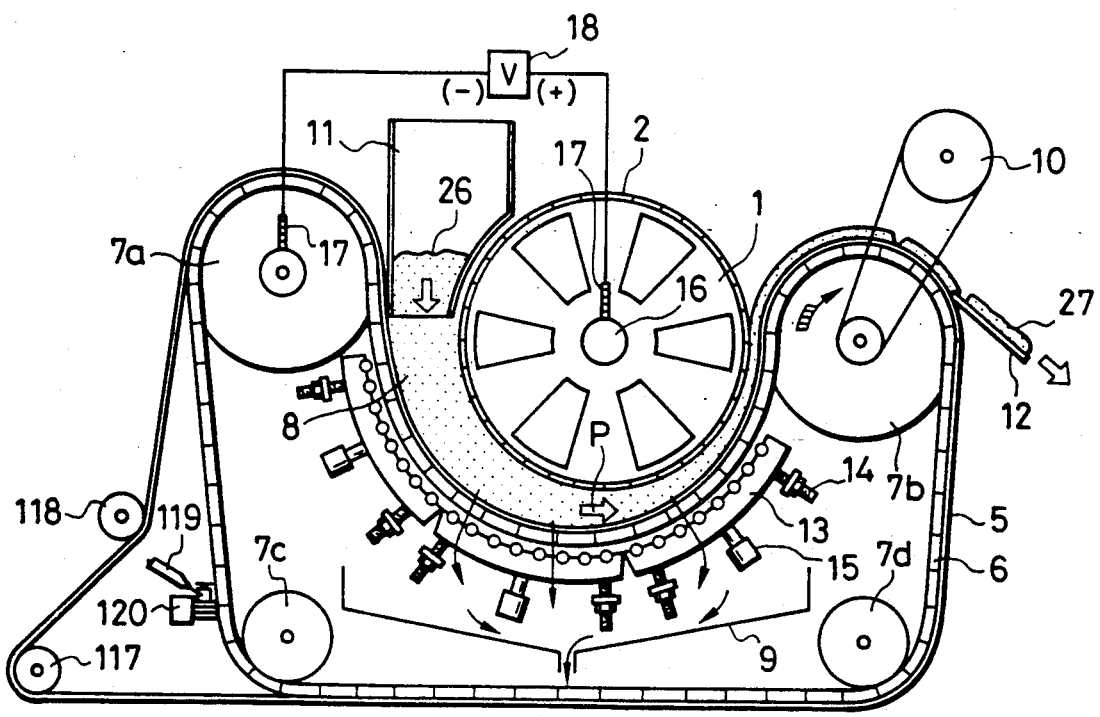
FIG. 4 is a diagram of a rotary drum type electroosmotic dewaterer embodying the present invention.
Figure 5:
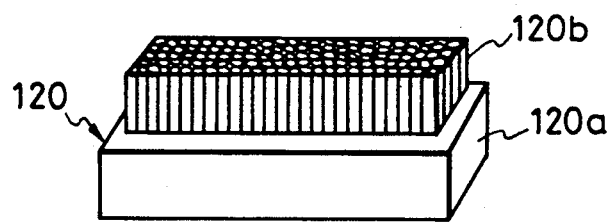
FIG. 5 is a perspective view of a brush type scraper exemplified as means for removing the deposits of FIG. 4.

FIG. 4 is a block diagram of an electroosmotic dewaterer embodying the present invention and FIG. 5 shows a brush type scraper arranged opposite to a cathode electrode as means for removing deposits, wherein like reference characters as those of FIG. 1 denote like parts. More specifically, the basic construction of the electroosmotic dewaterer is identical with what is shown in FIG. 1, whereas a filter belt 5 is set longer than a press conveyor 6. The filter belt 5 is stretched on auxiliary pulleys 117, 118 so that it is separated from the press conveyor 6 at a portion of its peripheral moving route, where a high-pressure jetting nozzle 119 and a brush type scraper 120 are installed opposite to the surface of the press conveyor 6, i.e., that of the electrode facing the mud. In this case, the high-pressure jetting nozzle 119 is installed so that a jet of high-pressure water is sent to the surface of the press conveyor 6, whereas the brush type scraper 120 is formed of, as shown in FIG. 5, a bundle of stainless wires 120b planted on a base 120a and made to abut against the surface of the press conveyor 6.

With that arrangement, white solid deposits containing a large quantity of calcium hydroxide are formed and attached to the surface of the press conveyor 6 of a cathode electrode while the electroosmotic dewaterer is being operated. However, the deposits are scraped off by the brush type scraper 120 as the press conveyor 6 turns and removed by the jet of high-pressure rinsing water. Accordingly, the press conveyor 6 free from the deposits is moved to the liquid mud compression passage 8 again and involved in the electroosmotic action as a cathode electrode. In the liquid mud compression passage 8 where the electroosmotic action takes place, the press conveyor 6 is allowed to maintain a conducting function as a cathode electrode in a clean state and simultaneously capable of letting the water filtered through the filter belt 5 be discharged into a filtered water receiving saucer 9 smoothly.

As means for removing the deposits, a rinsing tank filled with a rinsing liquid such as a water or a chemical agent and equipped with an ultrasonic wave transmitter, other than the brush type scraper and high-pressure water jetting nozzle as shown in the drawing, may be installed on the periphery of the press conveyor 6 so as to remove the deposits on the press conveyor or electrode passed through the rinsing tank by means of the action of ultrasonic cavitation. Otherwise, a rinsing tank filled with a chemical agent such as hydrochloric acid about 10 times diluted may be installed on the periphery of the press conveyor 6, for instance, so as to dissolve and remove the deposits, particularly calcium hydroxide as the principal content contained therein, on the electrode by letting the press conveyor pass through the rinsing tank.

Although an application of the present invention to a pressure-drum type electroosmotic dewaterer has been described in the above embodiment, the present invention is applicable to a belt press type electroosmotic dewaterer using an endless press belt as an anode electrode, instead of the rotary drum as illustrated in the aforesaid embodiment.

Figure 6:
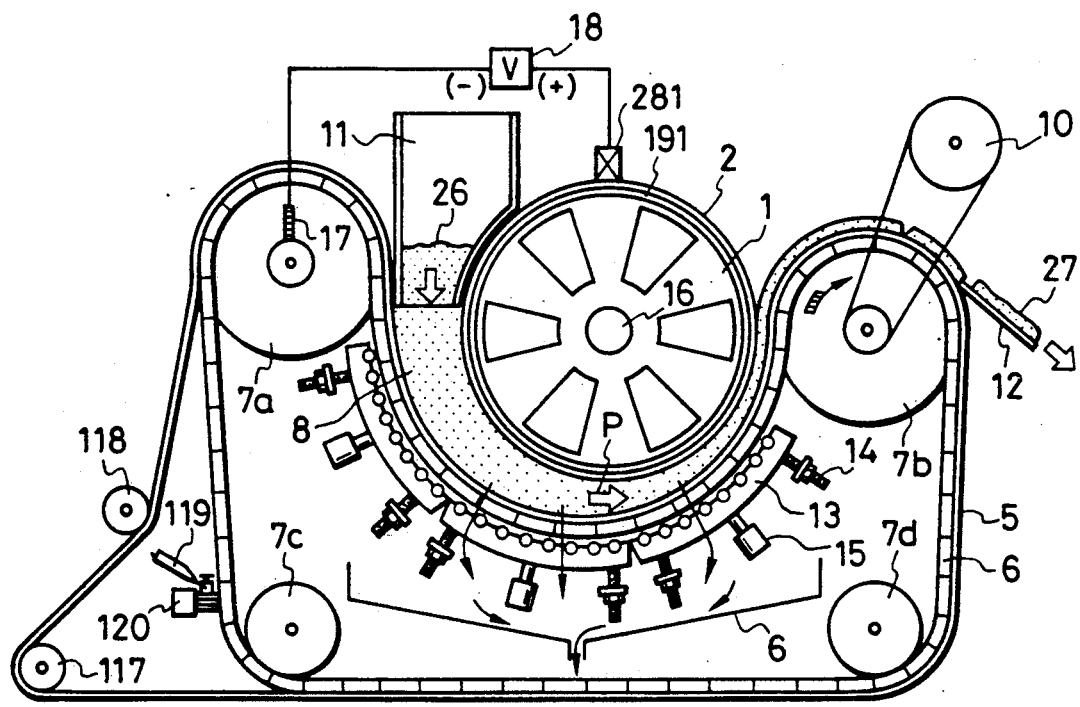
FIG. 6 is a diagram of another rotary drum type electroosmotic dewaterer embodying the present invention.

FIG. 6 is a block diagram of another electroosmotic dewaterer which is the improvement of that shown in FIG. 4. Like reference characters as those of FIG. 4 denote the like parts.

In FIG. 6, an anode electrode 2 is bonded via an insulating material 191 to the outer periphery of a rotary drum 1 of a rotary body and a power supply mechanism 281 is arranged opposite to the outer periphery of the electrode 2 in the opposite area of a liquid mud compression passage 8 so as to supply voltage from a d.c. power supply 18 via the power supply mechanism 281 to the electrode 2.

Figure 7:
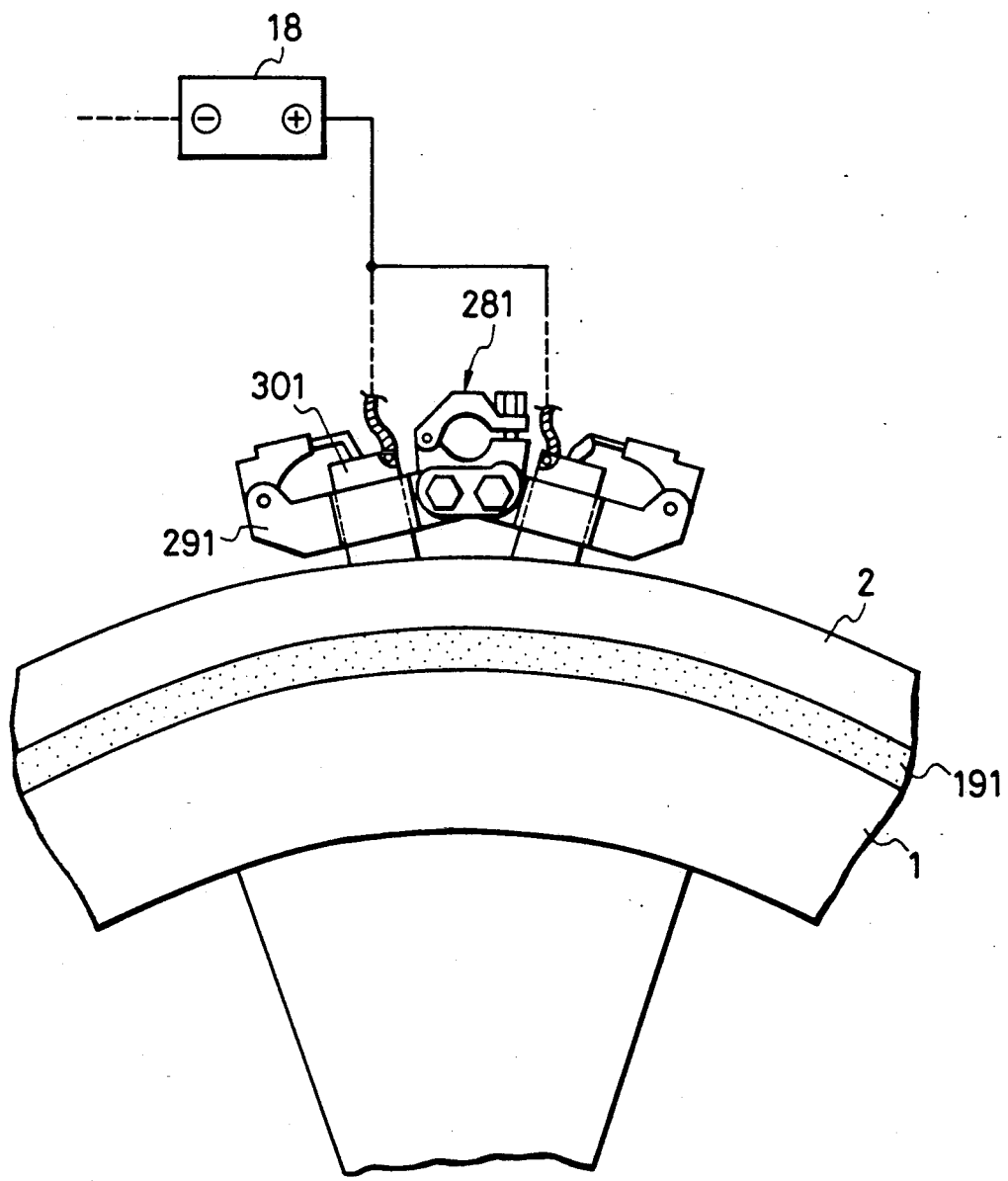
FIG. 7, 8 and 9 are concrete block diagrams illustrating the power supply mechanism on the anode electrode of FIG. 6, respectively.
Figure 8:
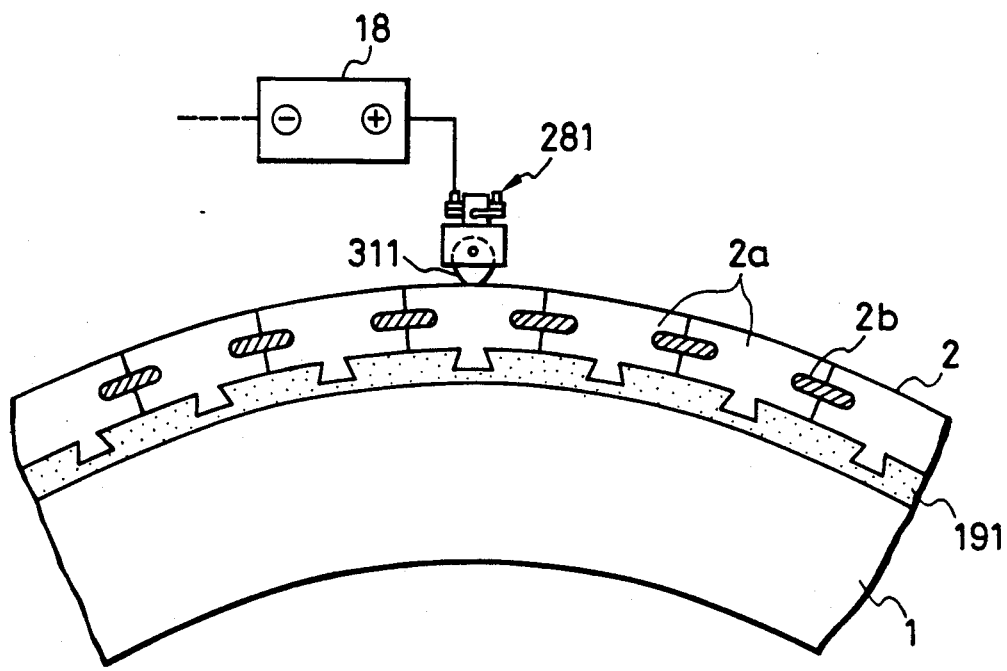
Figure 9:
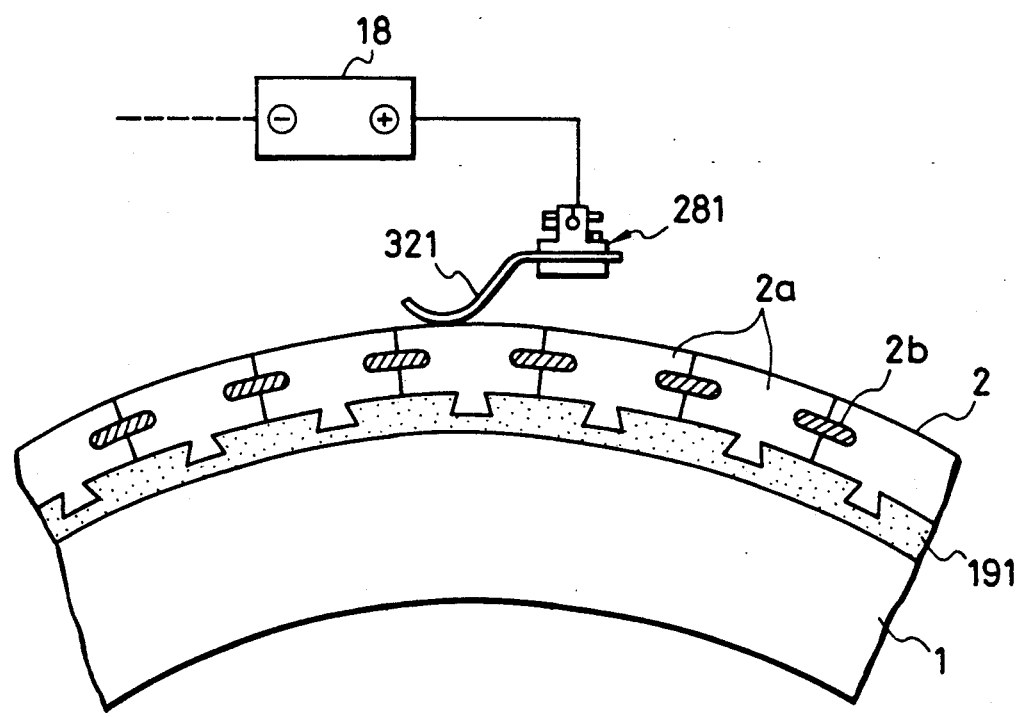

Several embodiments of the power supply mechanisms 281 will be shown by reference to FIGS. 7, 8 and 9. FIG. 7 shows a brush type power supply mechanism wherein a carbon brush 301 held by a brush holder 291 is abutting against the anode electrode 2 and is connected via a lead wire to the power supply 18, the brush holder 291 being held via an insulating supporting shaft to the frame. FIG. 8 shows a roller type power supply mechanism wherein a current collecting roller 311 connected to the power supply 18 is arranged so that it abuts against the outer peripheral surface of the anode electrode 2. In this embodiment, a number of segments 2a disposed on the peripheral surface of the rotary drum 1 constitute the anode electrode 2 and each segment 2a is coupled via a dovetail to an insulating material 191 and electrically connected via a crossover lead 2b to an adjacent one. The electrode 2 is thus divided into segments 2a so that any one of them corroded or worn out may be replaced on a segment basis. FIG. 9 shows an example of a shoe type power supply mechanism instead of the employment of a roller of FIG. 8, wherein a shoe 321 of resilient metal made of copper-beryllium alloy is arranged so as to slide on the electrode surface.

Figure 3:
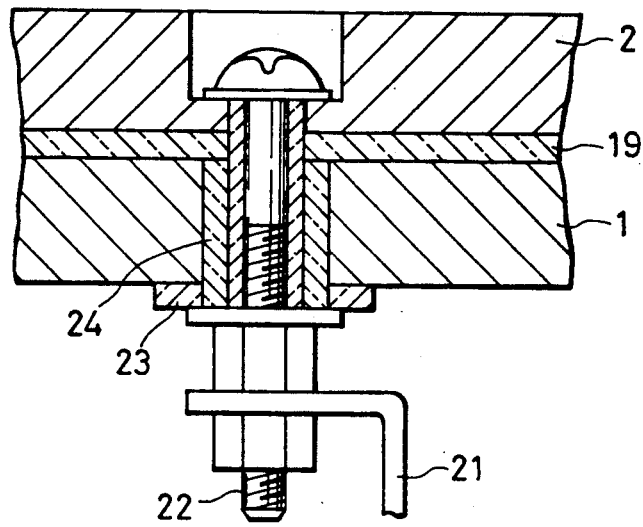
FIG. 3 is a partially enlarged sectional view of the power supply structure to the anode electrode of FIG. 2.

In the power supply mechanism thus constructed, the voltage supplied by the power supply 18 is applied via the power supply mechanism 281 to the anode electrode 2. The electrode 2 is completely separated via the insulating material 191 from the rotary drum 1 over the whole peripheral area of the electrode 2 and, contrary to the prior art as shown in FIG. 3, defective insulation due to the entrance of steam into a gap does not occur.

Figure 2:
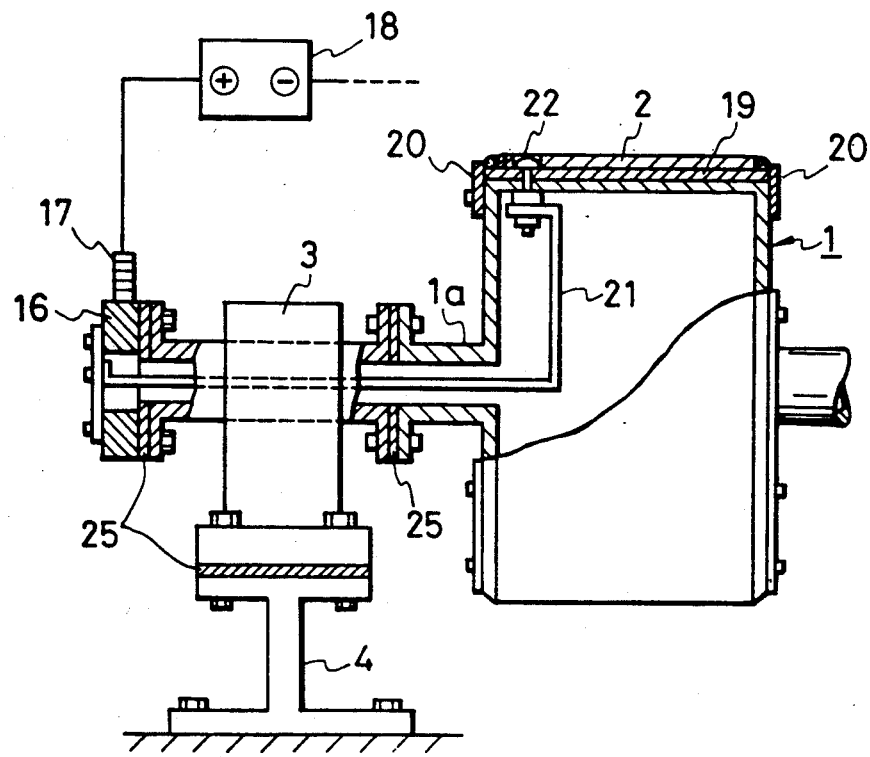
FIG. 2 is a sectional view of the rotary drum of FIG. 1.

The insulation between the electrode 2 and the rotary drum 1 is thus maintained. It is also possible to omit an insulation backup means provided, as shown in FIG. 2, between the rotary drum 1 and the grounded frame 4 by dividing the drum shaft and so on. That is, the electroosmotic dewaterer can be simplified in construction.

Each of the power supply mechanisms to the anode illustrated above may be installed opposite to the side edge of the electrode 2 and is used to directly supply power. As another application of the invention, a waterproof insulated lead drawn from the electrode 2 may be made to creep about the side of the rotary drum 1 and connected to a slip ring installed on the drum shaft, and the power supply mechanism 281 is installed opposite to the slip ring.

Figure 10:
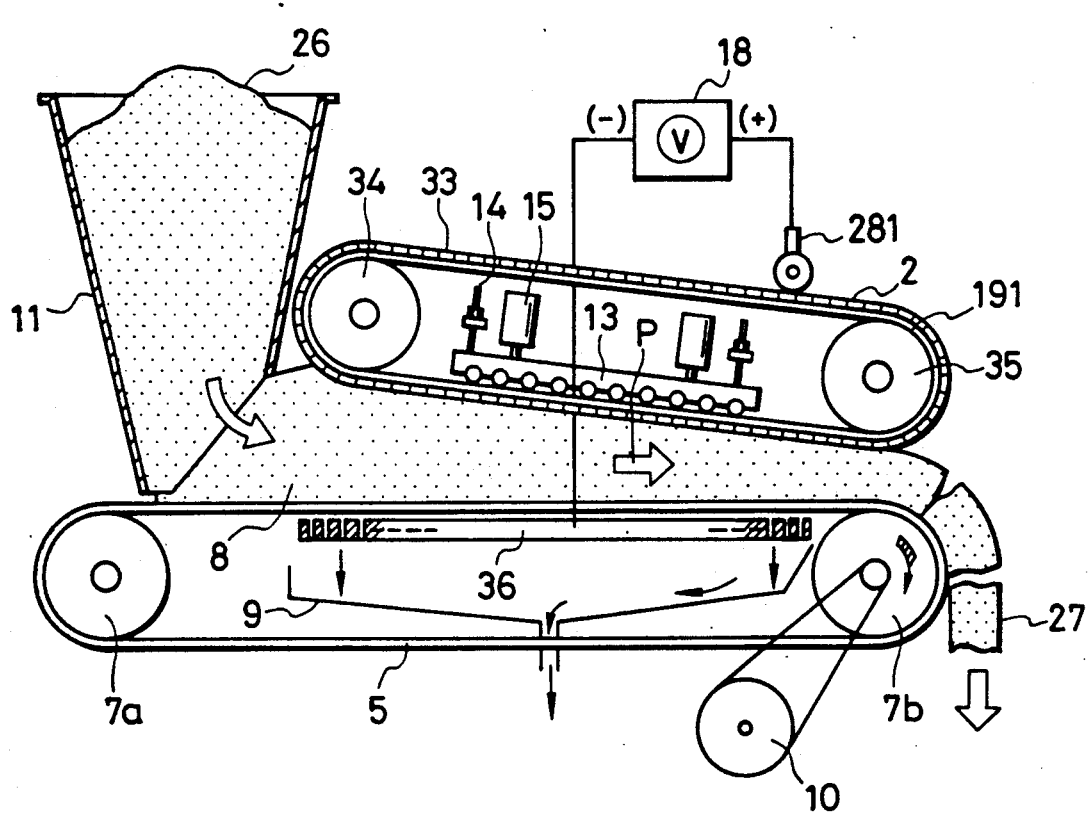
FIG. 10 is a block diagram of belt press type electroosmotic dewaterer embodying the present invention.

Although FIG. 6 illustrates a rotary drum type electroosmotic dewaterer, the present invention is applicable to a belt press type electroosmotic dewaterer shown in FIG. 10. More specifically, the endless press belt 33 is, as shown in FIG. 9, simultaneously used as the anode electrode 2 and the press belt 33 is superposed on the insulating material 191 such as a rubber belt before being stretched on a pair of sprockets 34, 35. Moreover, the cathode electrode 36 is fixed to the rear face of the filter belt 5 located lower opposite to the press belt of the anode electrode via the liquid mud compression passage 8, the press 13 being installed on the rear side of the press belt in the area of the liquid mud compression passage 8. By the way the power supply mechanism 281 to the anode electrode 2, the roller type power collector mechanism shown in FIG. 8, for instance, may be arranged opposite to the press belt and made slidable thereon. With the aforesaid power supply arrangement, power can be supplied to the anode electrode 2 without fear of power leakage similarly to the embodiment of FIG. 6.

Figure 11:
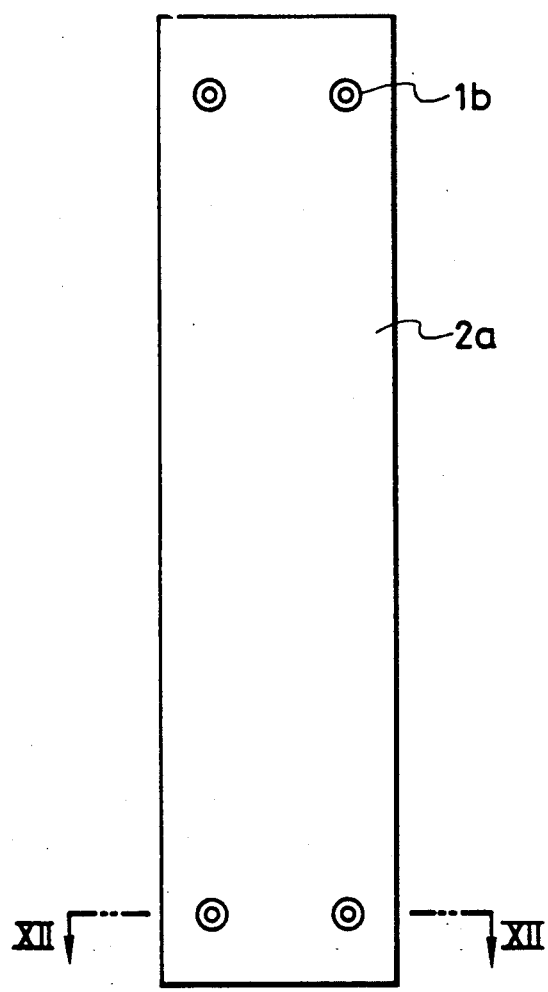
FIG. 11 is a top view of an electrode segment of an anode electrode embodying the present invention.
Figure 12:
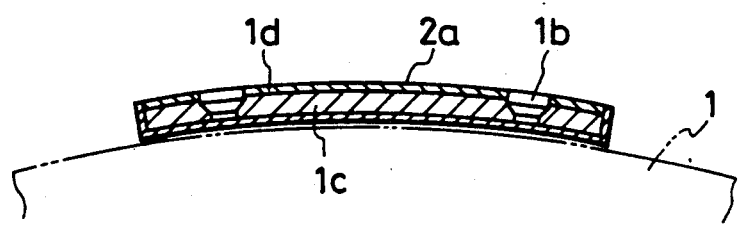
FIG. 12 is a sectional view taken along the line II~II of FIG. 11.

FIGS. 11 and 12 show a segment of an anode electrode embodying the present invention. The electrode segment 2a is mounted on the periphery of a rotary drum 1 as an anode electrode for an electroosmotic dewaterer and formed of a sliplike plate arcuate in cross section. Bolts are fitted into bolt holes 1b bored at four corners of the plate and the electrode segments are arranged in a row on the periphery of the rotary drum 1 and fixed with the bolts.

Each electrode segment 2a is formed by bending a sliplike plate prepared from metal valve material such as titanium steel in an arcuate shape which conforms to the peripheral face of the rotary drum 1 and covering the metal valve plate thus formed into an electrode base 1c with a coating layer 1d of platinum metal including palladium, tellurium, rhodium or what contains at least one kind of platinum oxide, so that the composite electrode is formed. The method of coating the layer 1d comprises electroplating the surface of the electrode base 1c made of titanium steel using a diamino nitrous acid, platinum chloride acid, platinum chloride acid ammonium bath, or applying a liquid with platinum metal chloride dissolved in alcohol or fine powder of platinum metal oxide dispersed in water or alcohol to the surface thereof, drying the liquid, burning the electrode base in a heating oven at about 500° C. to deposit the platinum metal or platinum metal oxide to form the coating layer 1d. When the coating layer 1d of the electrode segment 2a is worn out because of the long use of the anode electrode, the electrode segment 2a is removed from the rotary drum and caused to undergo the aforesaid process of forming the coating layer 1d on the surface thereof again to regenerate the electrode.

Figure 13:
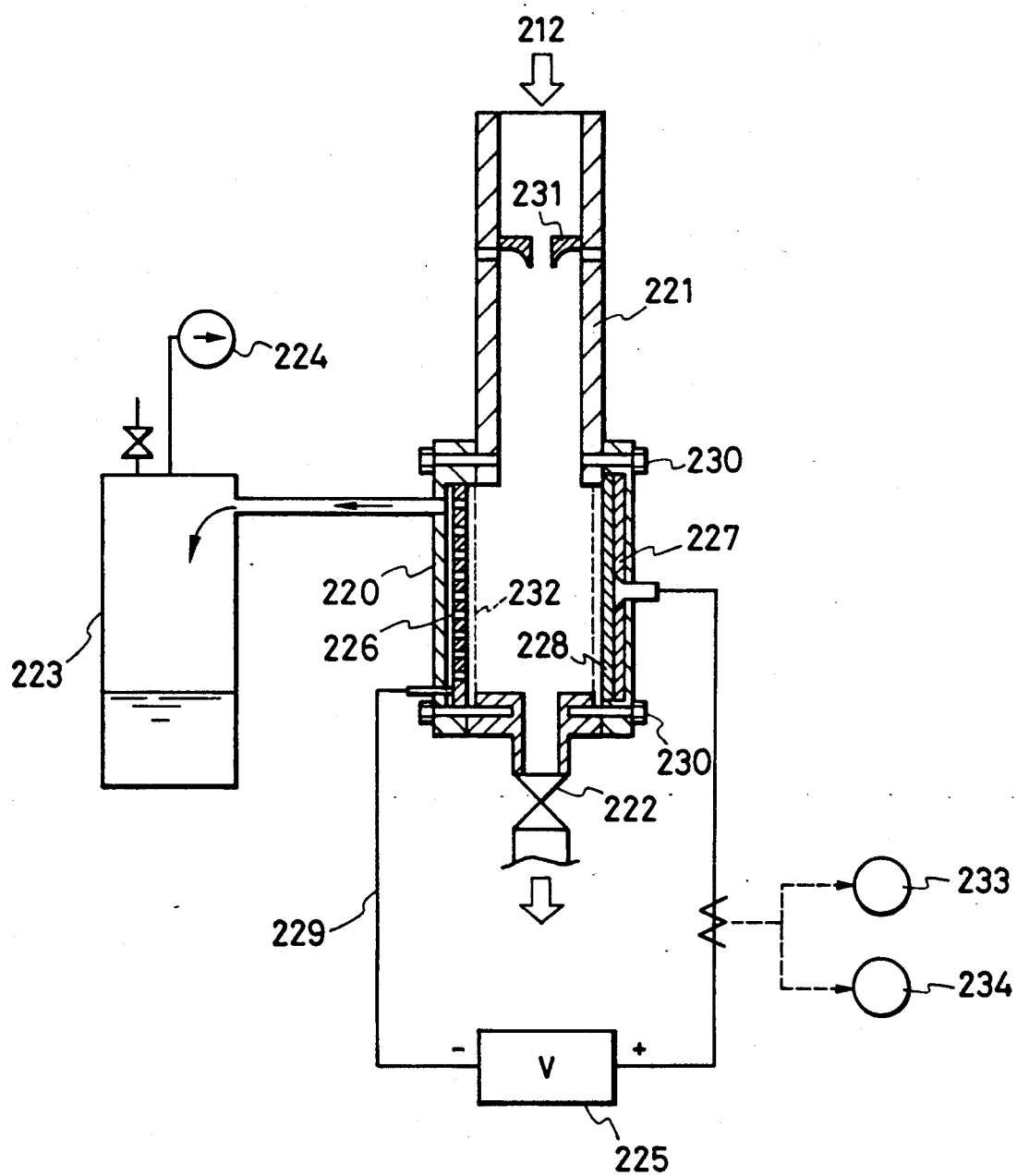
FIG. 13 is a block diagram of an experimental device used for examining the reduced weight quantity characteristics of various electrode materials due to the current flow to the electrode.

A description will subsequently be given to the results of experiments made by the present inventors on the wear characteristics of electrodes for the electroosmotic dewaterer energized with power as compared with those of electrodes prepared from other materials. In order to implement the aforesaid experiments, a batch type electroosmotic dewaterer shown in FIG. 13 was prepared. In FIG. 13, there is shown an arrangement of a dehydrating container 220 composed of transparent acyrilic assembly plates, a liquid mud supply 221 coupled to the upper side of the dehydrating container 220, a valve 222 drawn from the bottom of the dehydrating container 220 and inserted across the liquid mud discharge channel, a vacuum tank 223 communicating with the dehydrating container 220 for recovering the filtered water, a vacuum pump 224, and a d.c. power supply 225, the dehydrating container 220 being equipped with a cathode electrode 226 in the form of a stainless porous plate at the vacuum pump side. Each of the anode electrodes 228 to be tested and made of various materials is superposed on a brass plate 227 of a current supplier and located opposite to the cathode electrode 226. A power supply circuit 229 is wired between the opposite electrodes 226 and 228 so that voltage is applied by the power supply 225 across the opposited electrodes 226 and 228. There are also shown bolts 230 for assembling the dehydrating container 220, a nozzle 231 installed in the liquid mud supply 221 for supplying liquid mud and a filtering cloth 232 spread over the inner peripheral face of the dehydrating container. Moreover, the power supply circuit 229 is equipped with an ammeter 233 and an integrating ammeter 234.

The operation of the testing electroosmotic dewaterer will subsequently be described. The electrode 228 to be examined was incorporated in the assembled dehydrating container 220 into which the liquid mud 212 was introduced via the liquid mud supply nozzle 231 and then the voltage was applied by the power supply 225 and the vacuum pump 224 is operated. The liquid mud sandwiched between the opposite electrodes 226 and 228 in the dehydrating container 220 is thus supplied with current for electroosmotic dehydration, whereby the water contained in the liquid mud is caused to move to the cathode electrode 226 and filtered through the filtering cloth 232 into the vacuum tank 223. On the other hand, the liquid mud in the dehydrating container 220 is gradually condensed as the dehydration progresses and the valve 222 is opened to discharge the liquid mud contained therein after a predetermined dehydrating time has elapsed. Rinsing water is injected through the nozzle 231 into the container to clean the inside thereof and then liquid mud containing a high percentage of water is supplied again in the same manner for electroosmotic dehydration. During this process, the current and the integrated current values required for the electroosmotic dehydration are measured, whereas the dehydrating container is disassembled to weigh the electrode 228 to be examined, after a predetermined time has lapsed, to obtain the consumed quantity of the electrode 228 as compared with the original one.

Table 2 indicates the wear characteristics of each specimen obtained from the experiments for the electroosmotic dehydration. Components of the materials used to prepare various electrodes in the above experiments are as follows for every specimen. The Numeral accompanying each of the chemical symbols of the components of each specimen represents weight %.

Specimen 1: stainless steel SUS 304 (Fe 70, Cr 19.5, Ni 10, C 0.08);
Specimen 2: stainless steel SUS 430 (Fe 82, Cr 18);
Specimen 3: nickel (Ni 100);
Specimen 4: titanium (Ti 100);
Specimen 5: Inconel 600 (Ni 76, Cr 16, Fe 7.2, Mn 0.2, Si 0.2, Cu 0.1);
Specimen 6: Incolloy 800 (Ni 32, Fe 46, Cr 20.6, Si 0.35, Cu 0.27, C 0.04); and
Specimen 7: composite material composed of titanium steel as basic material coated with iridium oxide and platinum.

The specimen 7 is a composite material having a coating layer of iridium oxide and platinum on the base of titanium steel and made through the process of applying, to a base of titanium steel with its surface chemically etched, a liquid of platinum acid chloride dissolved in butanol and further fine powder of iridium oxide uniformly dispersed therein (liquid A), burning the product in an atmosphere of air at about 500° C., applying a liquid of platinum acid chloride dissolved in butanol (liquid B) thereto, and burning it in the atmosphere of air at about 500° C., the aforesaid process being repeated four times.

TABLE 2

| Specimen | Testing Time (Hr) | Current density (A/dm$^2$) | Reduced quantity of weight (mg/A-Hr-dm$^2$) | Reduced quantity of thickness (mm/A year) |
|---|---|---|---|---|
| 1 | 7.25 | 1.09 | 156 | 17.3 |
| 2 | 32.6 | 2.27 | 943 | 105 |
| 3 | 7.25 | 1.09 | 1,050 | 103 |
| 4 | 21.2 | 1.91 | 1,080 | 210 |
| 5 | 50.6 | 2.16 | 625 | 68.3 |
| 6 | 15.8 | 2.27 | 709 | 77.6 |
| 7 | 30.0 | 3.19 | 0.002 | 0.00001 |

As is obvious from the results of experiments of Table 2, specimen 7 of the composite material prepared from titanium steel plate coated with iridium oxide and platinum showed an extremely small decreased weight quantity compared with the remaining specimens 1–6 and offered high electrochemical corrosion resistance. In this case, the iridium oxide and platinum corresponding to the small decreased weight quantity are liquated from the electrode and mixed with the substance to be treated and the filtered water. However, that quantity is extremely small and even smaller than what is normally present in the natural world, whereby the secondary environment pollution resulting from the operation of the electroosmotic dewaterer is almost nearly negligible.

Further, in order to confirm the practicality of the anode electrode formed of the composite material of the specimen 7, the present inventors actually operated the dewaterer for testing purposes by mounting the electrode segments 2a, as shown in FIGS. 10 and 11, manufactured by coating the iridium oxide and platinum with the base plate of titanium steel on the peripheral face of the rotary drum 1 for the electroosmotic dewaterer of FIG. 1. The dimensions of the rotary drum for the electroosmotic dewaterer used in the testing were 69 cm in diameter, 26 cm in width and the test operating conditions included the 20% concentration of liquid mud as a substance to be treated, 120 A supply current from the power supply and dehydrating time of 180 hours.

The electroosmotic dehydration testing under the aforesaid conditions resulted in the dehydration of the liquid mud up to a water percentage of 60~65%. When the electrode segments on the anode side were removed from the rotary drum after the testing and were examined, no external mechanical damage was observed and, according to the results of X-ray analysis, the worn out quantity of the electrode was only 30 mg for the total electrode segments mounted on the rotary drum. On the other hand, the total peripheral surface area of the rotary drum was 56 dm$^2$ and the dehydrating area opposite to the cathode electrode is less than half the total surface area, namely, 25 dm$^2$ or less. Accordingly, the mean current density is 120 A/25 dm$^2$=6.0 A/dm$^2$. Moreover, the effective time during which each electrode segment was involved actually in electroosmotic dehydration was the one during which the electrode passed through the liquid mud passage as the rotary drum turned. Consequently, the effective usable time of the anode electrode against the dewaterer operating time of 180 hours is (dehydrating area/total surface area of electrode)×operating time=(25 dm$^2$/56 dm$^2$)×180 Hr=80.4 Hr. The decreased weight quantity of the anode electrode per unit supply current and unit operating time becomes 30 mg/120 A×80.4 Hr=3.1×10$^{-3}$ mg/A-Hr-dm$^2$ from the aforesaid total worn out weight quantity 30 mg, the supply current 120 A and the effective usable time 80.4 Hr. Although the value thus calculated is slightly greater than the result of the experiment of Table 1, this appears due to the difference between the batch and continuous treating systems.

On the other hand, based on the worn out quantity 30 mg of the electrode under the dewaterer operating conditions and the mean specific gravity 22 g/cm$^3$ of iridium oxide and platinum, and assuming the dewaterer was continuously operated throughout the year, the decreased thickness quantity of each electrode segment was computed. The decreased thickness quantity was as small as 2.7×10$^{-6}$ mm/year. Moreover, if the decreased thickness quantity of the anode electrode continuously operated throughout the year is such a value, the space between the opposite electrodes is only slightly expanded and it is therefore possible to maintain the high performance of the electroosmotic dewaterer throughout the year without changing the power supply conditions, readjusting the gap of the liquid mud passage and replacing the anode segment during the operating period.

The aforesaid decreased thickness quantity of the electrode is one which is obtained under condition that the supply current density is 6.0 A/dm$^2$ and, if the dewaterer is operated with a current density lower than the above value, the anode electrode is prevented from wearing to a greater extent and the decreased thickness quantity is made smaller, whereby the life of the electrode is prolonged.

Next, current flow characteristics of anode electrode made of various materials including high silicon cast iron including more than 10 weight % of silicon according to the present invention, was examined by using the test apparatus shown in FIG. 13.

Table 3 shows the test results for each electrode obtained by the test apparatus. Components of each electrode to be examined are as follows. The Numeral accompanying each of the chemical symbols of the components represents its weight %:

Specimen 11: stainless steel SUS 304 (Fe 70, Cr 19.5, Ni 10, C 0.08);
Specimen 12: stainless steel SUS 430 (Fe 82, Cr. 18);
Specimen 13: nickel (Ni 100);
Specimen 14: titanium (Ti 100);
Specimen 15: Inconel 600 (Ni 76, Cr 16, Fe 7.2, Mn 0.2, Si 0.2, Cu 0.1);
Specimen 16: Inconel 800 (Ni 32, Fe 46.5, Cr 20.6, Si 0.35, Cu 0.27, C 0.04);
Specimen 17: sintered carbon plate (graphite 100);
Specimen 18: high silicon cast iron (Si 4, C 2.4, Fe 93);
Specimen 19: high silicon cast iron (Si 6, C 2.2, Fe 91);
Specimen 20: high silicon cast iron (Si 8, C 1.8, Fe 89);
Specimen 21: high silicon cast iron (Si 10, C 1.4, Fe 88);
Specimen 22: high silicon cast iron (Si 12, C 1.0, Fe 86);
Specimen 23: high silicon cast iron (Si 15, C 0.8, Fe 83); and
Specimen 24: high silicon cast iron (Si 16, C 0.9, Fe 82)

TABLE 3

| Specimen | Testing time Hr | Current density A/dm$^2$ | Reduced quantity of weight mg/A·Hr | Reduced quantity of thickness mm/A-year |
|---|---|---|---|---|
| 11 | 7.25 | 1.09 | 156 | 17.3 |
| 12 | 32.6 | 2.27 | 943 | 105 |
| 13 | 7.25 | 1.09 | 1,050 | 103 |
| 14 | 21.2 | 1.91 | 1,080 | 210 |
| 15 | 50.6 | 2.16 | 625 | 68.3 |
| 16 | 15.8 | 2.27 | 709 | 77.6 |
| 17 | 7.25 | 1.07 | 47.6 | 34.8 |
| 18 | 20.0 | 2.55 | 845 | 109 |
| 19 | 20.0 | 2.72 | 899 | 116 |
| 20 | 20.0 | 2.80 | 892 | 115 |
| 21 | 20.0 | 2.87 | 815 | 105 |
| 22 | 20.0 | 3.02 | 50.1 | 7.1 |
| 23 | 20.1 | 2.82 | 15.7 | 2.0 |
| 24 | 137 | 2.33 | 24.4 | 3.1 |

The reduced quantity of weight in table 3 represents loss of the electrode material per unit time while a unit current is supplied, whereas the reduced quantity of thickness therein is obtained from the relation of the reduced quantity of weight to the effective area of the electrode to be tested (the effective area of the electrode to be tested in this testing apparatus is 100 cm$^2$) assuming that the apparatus has been operated continuously throughout the year under the condition in which the unit current is supplied.

As is obvious from the test results shown in Table 3, the specimens 22, 23, 24 of high silicon cast irons containing more than 10% by weight of silicon according to the present invention, show a considerably lower reduction rate in not only weight but also thickness than that of each of specimens 11-21 and show high electrochemical corrosion resistance. The high silicon cast iron contains traces of Mn, S, P and Cu in addition to iron, silicon and carbon of the principal components. Even through the components are ionized to be resolved and mixed into the substances to be treated or filtered water because of the electroosmotic dehydrating action, the secondary pollution does not occur since they contains no heavy metals such as nickel and chrome which cause the secondary pollution.

Figure 14:
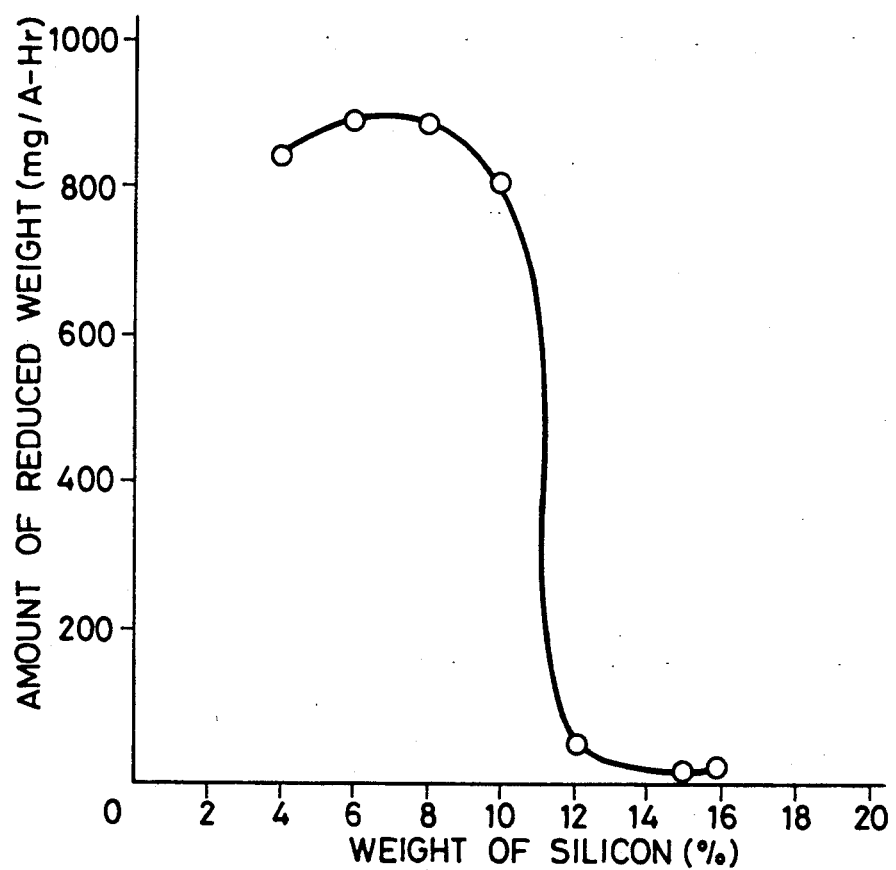
FIG. 14 is a characteristic chart illustrating the relation of the silicon content of high silicon cast iron as material for an electrode to the reduced weight quantity thereof due to the current flow.

FIG. 14 shows, as to the test results of the electrode materials made of high silicon cast iron according to the present invention, the relation of the reduced quantity of weight due to the current flow to the silicon content. The electrode made of the cast iron containing less than 10% by weight of silicon is worn out greatly as in ones made of remaining metals and therefore what contains more than 10% by weight thereof is evaluated as a superior wear resistant material.

Figure 15:
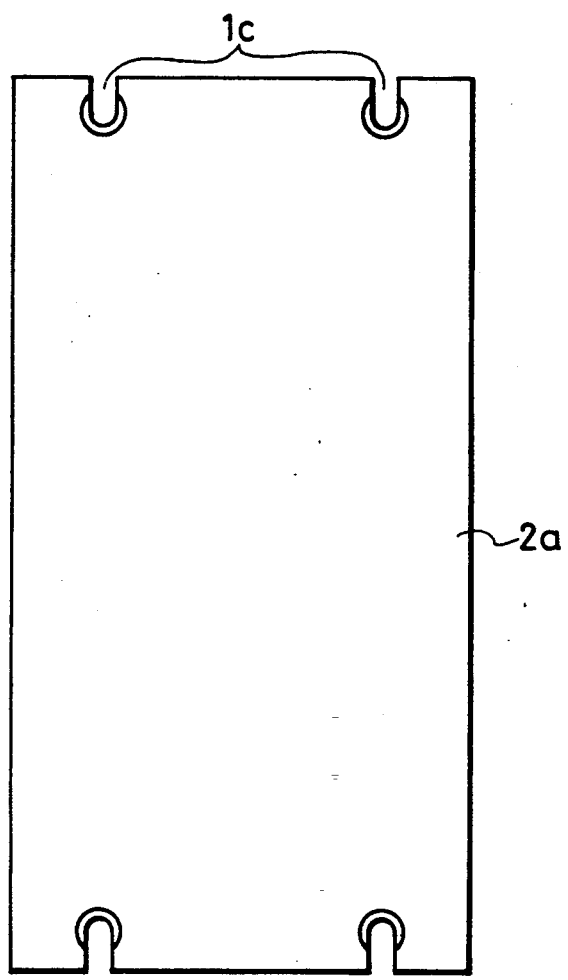
FIG. 15 is a top view of another electrode segment of an anode electrode embodying the present invention.
Figure 16:
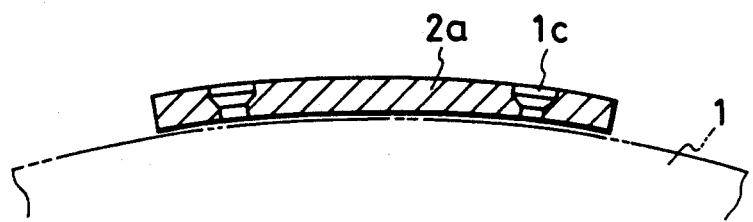
FIG. 16 is a sectional view of the electrode segment of FIG. 15.

On the other hand, the present inventors attempted to confirm whether the electrodes made of high silicon cast iron containing more than 10% by weight of silicon could be put to practical use and, for this purpose, prepared electrode segments shown in FIGS. 15 and 16 and mounted them on the rotary drum for the electroosmotic dewaterer shown in FIG. 1. A description will be given to the test results using the aforesaid segments.

The dimensions of a rotary drum for an electroosmotic dewaterer used for testing were 69 cm in diameter and 26 cm in width. The testing conditions were such that the concentration of liquid mud as a substance to be tested was 20% and a current of 90 A was supplied by a power supply and the dewaterer was operated for 80 hours. According to the test results, the liquid mud was dehydrated up to 60 to 65% in terms of water content. The electrodes were taken out after testing and were examined. No external mechanical damage was found and the total reduced quantity of the weight of the electrodes was 96 g. On the other hand, the total area of the rotary drum is 56 dm$^2$ and the dehydration area faced the cathode side press belt was less than half of the total area, i.e., 25 dm$^2$. Consequently, the mean density of the current supplied during operation was 90 A/25 dm$^2$ = 3.6 A/dm$^2$. Moreover, since the effective time during which the electrode is actually involved in the electroosmotic dehydration is one during which the liquid mud passes through the liquid mud compression passage, the effective usable time of the electrode is (dehydrating area/the total area of electrode) × dewaterer operating time = (25 dm$^2$ × 56 dm$^2$) × 80 Hr = 36 Hr. Therefore, the reduced weight quantity of electrode per unit supply current, per hour can be obtained from the aforesaid total worn out quantity of 96 g, the supply current of 90 A and the effective usable time of 36 Hr to be 96 g/(90 A × 36 Hr) = 30 mg/A·Hr.

Although this value is slightly greater than what has been shown in Table 3, it seems attributable to the difference between batch and continuous processing systems.

On the other hand, based on the aforesaid reduced weight quantity, the reduced thickness quantity of the electrode amounts 6.1 mm on the assumption that the dewaterer is continuously operated throughout the year, and in view of a specific gravity (6.8 g/cm$^3$) of the high silicon cast iron, the total surface area of the electrode and the effective usable time. Reduced thickness quantity = reduced weight quantity/(specific gravity of high silicon cast iron × total surface area of electrode × effective usable time) Consequently, if the reduced thickness quantity of the electrode continuously operated during the whole year is such a value, a change of the gap between the facing electrodes remains small and, without specifically changing the power supply condition, employing means for adjusting the passage gap or replacing the electrode, the desired electroosmotic dehydrating performance can be maintained. The aforesaid reduced thickness quantity of the electrode represents a value where the supply current density is 3.6 A/dm² and, if the value is smaller, the loss or the reduced thickness quantity of the electrode also becomes less, so that life of the electrode may be prolonged.

Moreover, since the high silicon cast iron mainly contains iron and silicon, it is readily molded into desired shape by means of dies and thus features excellent processability. In addition, the high silicon cast iron is as conductive as other metal materials, and its specific resistance is about 1/10 of that of the aforesaid carbon sintered plate, so that not only resistance loss accompanied with current flow but also power consumption of working apparatus is small.

As described above, an electroosmotic dewaterer according to the present invention is equipped with means for removing the deposits formed and attached onto the surface of the cathode electrode during the dehydrating operation. Accordingly, it becomes possible to operate the electroosmotic dewaterer at high dehydrating efficiency by keeping the surface of the cathode electrode clean by removing the deposits formed thereon during the operation and preventing an increase in needless power loss and reduction in filtered water discharging function.

Further, according to the present invention, the anode electrode is mounted via an insulating material on the peripheral face of the rotary body and voltage is applied via a power supply mechanism by the power supply to the outer peripheral face thereof. Consequently, no power supply connecting bolts passing through the rotary body as in the case of the conventional machine are required and, even if the electroosmotic dewaterer according to the present invention is exposed to steam during the operation thereof, failure of insulation and leakage of power attributed thereto can be prevented without fail. In addition, the insulating construction with respect to the power supply passage toward the anode electrode can be made simpler than the conventional construction. Also, the effect of the present invention includes improvement in safety and reliability to a large extent.

Still further, according to the anode electrode of the present invention, the following effects are achieved:

(1) The liquating quantity of the electrode due to the current flow is small and therefore the performance of the electroosmotic dewaterer can be maintained without replacing the worn out electrode and it can be operated continuously for a long period of time with reliability and at a high operation rate.

(2) The liquidating quantity during the operation of the electroosmotic dewaterer is so small as to be negligible and the liquated component is harmless, so that almost nearly no secondary environmental pollution is caused even though the liquated component is mixed with the substance to be dehydrated and the filtered water.

(3) The excellent mechanical strength and wear resistance allows the electrode to sufficiently withstand the liquid mud compression load applied during the dehydrating operation.

(4) The valve metal as an electrode base is light in weight, high in mechanical strength, and easy in bending operation and cutting operation in addition to the conducting function, so that the manufacture of electrodes having a large area is easy.

(5) It is only necessary to coating the surface of the electrode base of valve metal with platinum metal or platinum oxide to a minimum extent required for the formation of a thin film serving as an electrochemical interface and the coating layer can readily be formed by electroplating or pyrolysis, so that the electrodes is manufactured less costly. Moreover, even if the coating layer of the electrode is worn out during a long operation, the coating layer can be regenerated through the aforesaid process and reusable.

(6) Since the high silicon cast iron of the electrode contains no heavy metals such as nickel and chrome, there is almost nearly no fear of secondary pollution even if the worn out portion of the electrode is mixed with substances to be treated or filtered water.

(7) Since the high silicon cast iron is highly conductive and offers great mechanical strength, so that the electrode can bear a large compressive load.

(8) The high silicon cast iron offers excellent processability when it is molded into electrodes.

In other words, the anode electrode of the present invention is capable of meeting electrical and mechanical properties required for electrodes of the electroosmotic dewaterer, so that it is durable and is excellent practical values.

What is claimed is:

1. An electroosmotic dewaterer for dehydrating a liquid substance, comprising:
   a power supply for generating a d.c. voltage;
   an anode electrode for applying said d.c. voltage to the liquid substance, said anode electrode being mounted to a rotary body;
   an insulation member covering all of the outer surface along the periphery of said rotary body, said anode electrode arranged over said insulation member, said insulation member electrically insulating and completely physically isolating said anode from said rotary body;
   a cathode electrode facing said anode electrode for applying said d.c. voltage to the liquid substance located between said anode electrode and said cathode electrode and for collecting water from said liquid substance to cause the formation of dehydrated mud cake and mineral deposits on said cathode electrode;
   means for receiving said collected water;
   means for removing said dehydrated mud cake from said cathode electrode;
   means for removing mineral deposits from said cathode electrode; and
   means for applying said d.c. voltage from said power supply means to the surface of said anode electrode facing out from said rotary body.

2. An electroosmotic dewaterer as claimed in claim 1, wherein said means for removing mineral deposits includes a brush type scraper abutting the surface of said cathode electrode for mechanically removing said mineral deposits.

3. An electroosmotic dewaterer as claimed in claim 1, wherein said means for removing mineral deposits includes a high-pressure water rinser for removing the deposit by sending a jet of pressurized water to the surface of said electrode.

4. An electroosmotic dewaterer as claimed in claim 1, wherein said means for removing mineral deposits includes an ultrasonic rinser for removing the deposit by ultrasonic wave cavitation action.

5. An electroosmotic dewaterer as claimed in claim 1, wherein said means for removing mineral deposits is a chemical rinser for dissolving and removing the deposit by chemical agents.

6. An electroosmotic dewaterer as claimed in claim 1, wherein said rotary body is operable for rotating and carrying said liquid mud through a passage between said anode and cathode electrodes.

7. An electroosmotic dewaterer as claimed in claim 6, wherein said means for applying said d.c. voltage slides on the outer surface of said anode electrode.

8. An electroosmotic dewaterer as claimed in claim 7, wherein said power supply mechanism is installed on the periphery of said anode electrode outside the electroosmotic dehydrating area.

9. An electroosmotic dewaterer as claimed in claim 7, wherein said means for applying said d.c. voltage includes a carbon brush contacting the outer surface of said anode electrode.

10. An electroosmotic dewaterer as claimed in claim 7, wherein said means for applying said d.c. voltage includes a roller contacting the outer surface of said anode electrode.

11. An electroosmotic dewaterer as claimed in claim 7, wherein said means for applying said d.c. voltage includes a shoe type contact contacting the outer surface of said anode electrode.

12. An electroosmotic dewaterer as claimed in claim 1, wherein said anode electrode is a composite structure comprising a metal valve plate as an electrode base and a coating layer including platinum metal or a platinum metal oxide, said coating layer being formed on said electrode base.

13. An electroosmotic dewaterer as claimed in claim 12, wherein said metal valve plate is made of titanium and said coating layer is made of oxidized iridium and platinum metal.

14. An electroosmotic dewaterer as claimed in claim 1, wherein said anode electrode is made of cast iron containing more than 10% by weight of silicon.

15. An electroosmotic dewaterer for dehydrating a liquid substance, comprising:
   a power supply for generating a d.c. voltage;
   an anode electrode for applying said d.c. voltage to the liquid substance, said anode electrode including an endless press belt;
   a cathode electrode facing said anode electrode for applying said d.c. voltage to the liquid substance located between said anode electrode and said cathode electrode and for collecting water from said liquid substance to cause the formation of dehydrated mud cake and mineral deposits on said cathode electrode, said cathode electrode including an endless belt;
   means for receiving said collected water;
   means for removing said dehydrated mud cake from said cathode electrode;
   means for removing mineral deposits from said cathode electrode; and
   means for applying said d.c. voltage from said power supply means to the surface of said anode electrode facing out from the endless press belt.

* * * * *